United States Patent [19]
Saunders et al.

[11] 3,818,193
[45] June 18, 1974

[54] ROAD-USAGE METER

[75] Inventors: Peter Charles Saunders, Newick near Lewes; Dennis William Revell, London; Terence James Clarke, Swanley, all of England

[73] Assignee: National Research Development Corporation, London, England

[22] Filed: Nov. 20, 1972

[21] Appl. No.: 307,832

[30] Foreign Application Priority Data
Nov. 26, 1971 Great Britain...................... 5514/71

[52] U.S. Cl............ 235/92 FP, 235/92 R, 340/256, 340/280, 235/92 TC
[51] Int. Cl. .......................................... G08b 13/14
[58] Field of Search..... 235/92 TC, 92 FP; 340/256, 340/282, 280

[56] References Cited
UNITED STATES PATENTS
3,120,602  2/1964  Lagarde.......................... 340/282 X
3,618,065  11/1971  Trip et al............................. 340/280

Primary Examiner—Paul J. Henon
Assistant Examiner—Joseph M. Thesz, Jr.
Attorney, Agent, or Firm—Cushman, Darby & Cushman

[57] ABSTRACT

A metering device with anti-misuse safeguards, primarily for use as a road-usage meter on a vehicle. The meter will not record until it has been engaged with the anti-misuse device; engagement breaks an electrical link within the meter. Subsequent disengagement of meter and device breaks a second electrical link; this breakage indicates that the meter has been interfered with. The anti-misuse device may be fixed to the vehicle and constitute the mounting for the meter upon the vehicle.

7 Claims, 5 Drawing Figures

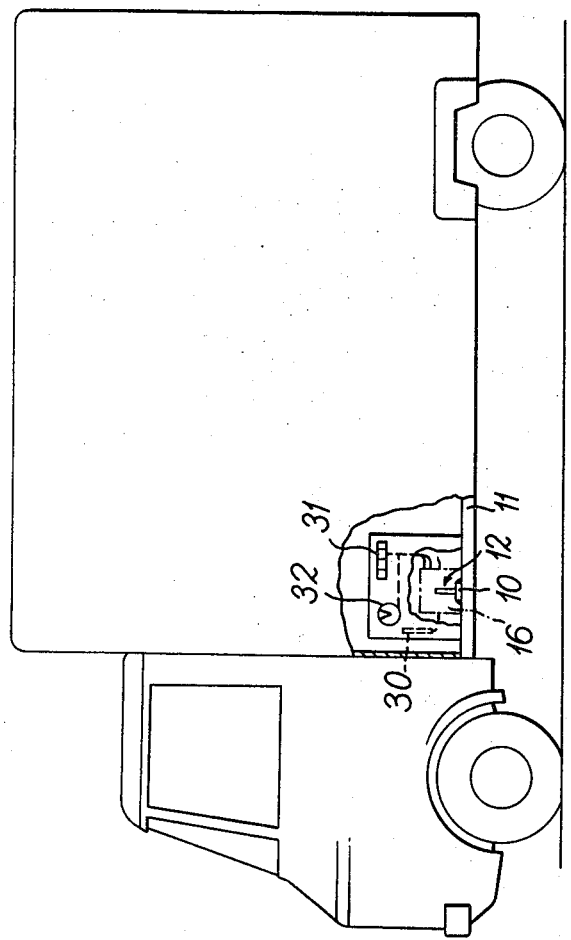

ROAD-USAGE METER

This invention relates to metering apparatus, especially to such apparatus of the integrating type which meters a given quantity continually, and displays a record which increases continually and must be read at intervals. Such apparatus is often the target for misuse and for interference with the record and the metering mechanism, and the present invention is directed to ways of countering such misuse and interference.

The invention relates particularly to road-usage meters, i.e., meters for mounting on a vehicle to measure the usage by that vehicle of roads, particularly roads having signal-producing means, the signals from which are detected by the meter. A charge may then be levied upon the measured and recorded use of those roads. Such meters are in particular danger of being temporarily and improperly removed from the vehicles on which they are mounted, so that their records may be interfered with and so that they do not record at all while they are removed. There is the secondary danger that dishonest users will fail to install them properly on the vehicles in the first place, so that they do not even begin to record until some moment that the user chooses.

This invention is concerned with these dangers, and includes vehicles fitted with such meters. The scope of the invention is defined by the claims at the end of this specification, and metering apparatus according to it will now be described by way of example with reference to the accompanying drawings, in which:

FIG. 5 is a diagrammatic drawing showing the meter assembled on a vehicle.

Figure 1:
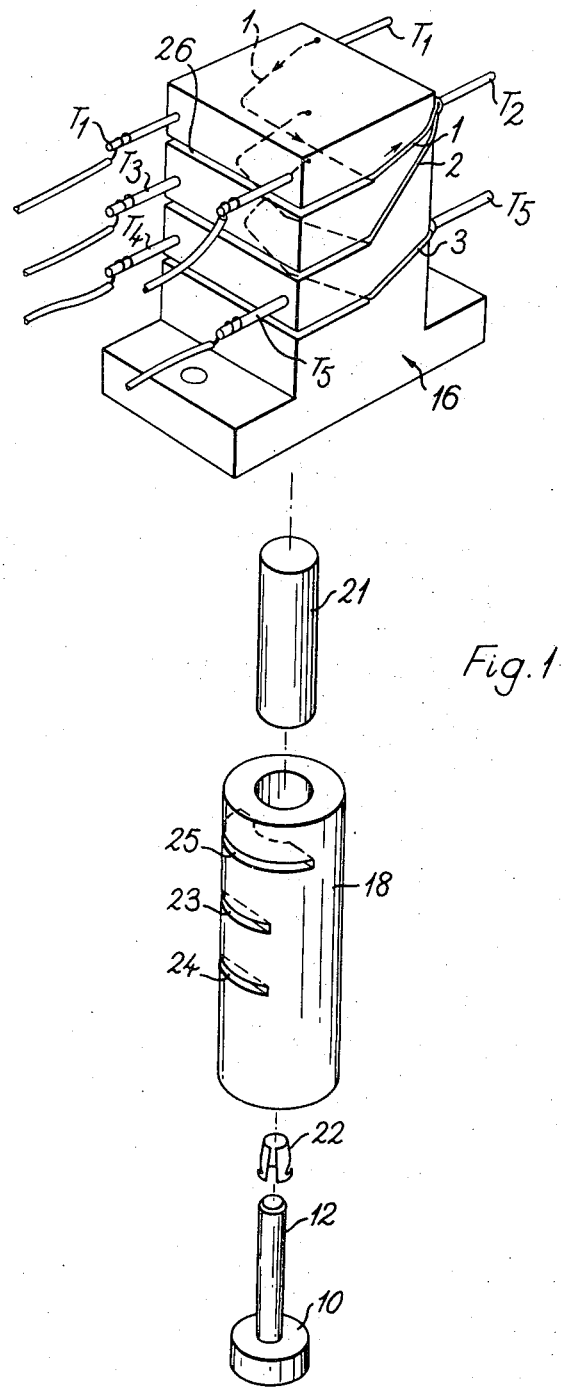
FIG. 1 is an exploded view of some of the parts of a road-usage meter.

The meter shown in the drawings may for instance be of the kind for use on roads having transmitting loops embedded therein. These loops will produce signals, e.g., pulsed radio frequency electromagnetic oscillations to which the meter responds. The meter has aerial means for receiving the pulses, and a counter for counting the oscillations so as to allow a charge to be made relative to the actual use made of roads having said loops. A visual indicator is provided to show that the meter is working and that the vehicle is using a road having the loops, the indicator showing alternately black and white. The signal received from each loop is divided into two parts, one negative pulse and one positive pulse, and the indicator is arranged to show white in response to the first pulse and black in response to the second pulse.

Referring to the drawings, the chassis 11 of a vehicle 28 (FIG. 5) has rigidly secured thereto, for instance by welding, the broad head 10 of a pin 12.

Figure 3:
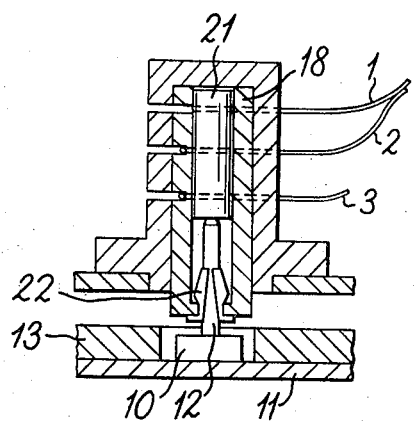
FIG. 3 is a section through the same parts when fully assembled.
Figure 4:
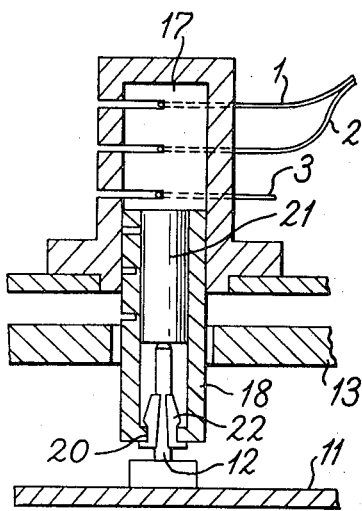
FIG. 4 illustrates the effect of disassembly of the parts.

This pin serves as the mounting for the meter upon the vehicle, and also as an anti-misuse and actuating device for the meter. The casing 13 of the road-usage meter has an opening 14 therein, into which the actuating pin 12 is inserted when the meter is being mounted on the vehicle. Adjacent the opening 14 within the meter is a circuit block 16 having a central cylindrical blind opening 17 (FIGS. 2 – 4).

An open-ended sleeve 18 is slidably mounted within the cylindrical opening 17, and has a collar 20 at one end thereof. A solid insulating plug 21 slides within the sleeve 18. A non-return spring clip 22 is positioned within the collar 20 and has a central opening through which the pin 12 may pass to contact the plug 21.

Circuit block 16 has three initially continuous copper circuit links passing therethrough. One of these, link 1, extends from a first terminal $T_1$ through a slot 26 in block 16 and a corresponding slot 25 in sleeve 18 across the central bore of sleeve 18, then out through slots 25 and 26 again to a second terminal $T_2$. A second circuit link 2 extends from terminal $T_2$ through a second slot in block 16, is guided around the circumference of sleeve 18 in a groove 23 thereon and through said second slot to a third terminal $T_3$. Link 2 therefore does not extend across the central bore of sleeve 18. Similarly a third link 3 extends between fourth and fifth terminals $T_4$ and $T_5$ around a second groove 24 in sleeve 18. The terminals $T_1 - T_5$ extend through the circuit block 16 and are connected into the electrical circuit of the meter. Link 3 is connected into the circuit of the aerial 30 and links 1 and 2 are connected into a circuit containing a counter 31 and a visual indicator 32.

Figure 2:
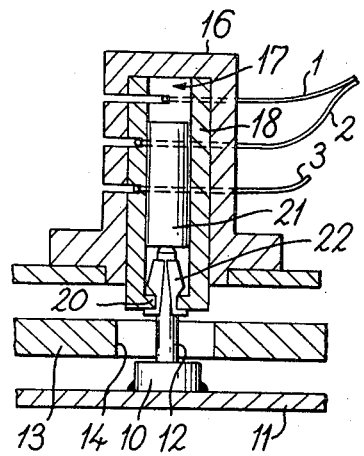
FIG. 2 is a diagrammatic section through the same parts when partly assembled.

When the meter is mounted in the vehicle, the pin 12 extends into the sleeve 18 through the non-return clip 22 and contacts the end of plug 21 as seen in FIG. 2. To complete the assembly the meter is pushed further on to pin 12, which thereby pushes the plug 21 further into the sleeve 18 into the position shown in FIG. 3. In this final movement link 1, which passes across the bore of sleeve 18, is cut. To check that the meter has once been fully and correctly mounted on pin 12, it is only necessary to test for an open circuit between terminals $T_2$ and $T_1$. Such a circuit constitutes an indication that the meter has been properly installed.

If the meter is removed from pin 12 after once being correctly mounted on it, the non-return clip 22 grips both the actuating pin and the sleeve 18 so that the sleeve 18 is withdrawn from the meter as shown in FIG. 3. The remaining two links 2 and 3 are cut in this movement. The effect of cutting link 2 is that even if the meter is replaced an open circuit will exist between terminals $T_2$ and $T_3$ and this can be detected to show that the meter has been removed. In addition the cutting of link 3, which is connected to the meter aerial circuit, may conveniently cause a condition such that the meter will operate at the first pulse of the next loop signal but will not operate thereafter. This means that the visual indicator 32, which may for instance normally show black after a loop is passed, may instead remain continuously showing white. This condition can therefore be detected visually by police or traffic wardens stationed close to the end of a loop.

Although described with reference to a road-usage meter for mounting on a vehicle, this invention applies also to other meters, especially those that are conveniently located close to the apparatus whose performance or use they are intended to meter. Telephone and pay-television apparatus offer possible applications.

We claim:

1. Metering apparatus comprising the following features in combination:

a metering member;

an anti-misuse device;

co-operating inter-engagement means between said member and said device, whereby they may engage and disengage;

a first breakable link within said metering member, and adapted to be broken by disengagement of said member and said device; at least a second breakable link, breakable upon engagement of said member and said device; first indicator means operable upon breakage of said first link to indicate misuse of the apparatus;

and second indicator means operable upon breakage of said second link to indicate that said metering member has been brought into use.

2. Metering apparatus according to claim 1 in which said anti-misuse device carries attachment means whereby it may be attached to adjacent structure and may act as a mount for the metering member upon such structure.

3. Metering apparatus according to claim 1 in which said links are electrical connections, and in which at least some of said connections have terminals whereby the electrical continuity of the links may be checked.

4. Metering apparatus according to claim 1 in which said metering member carries a slidable member, in which said slidable member has a locking device adapted to grip said anti-misuse device upon the engagement of the latter with the metering member, said slidable member being withdrawable from said metering member in gripped engagement with said anti-misuse device upon disengagement of the latter from said metering member.

5. Metering apparatus according to claim 4 in which the metering member includes an electrical circuit block carrying electrical leads, in which the slidable member is mounted within this block, in which conduits defined by said slidable member carry said electrical leads, and in which said leads are severable by the relative movement of disengagement of said metering member and said anti-misuse device.

6. Metering apparatus according to claim 1 in which said metering member is of the integrating type.

7. A vehicle equipped to meter its road usage, and having the following features in combination:

a metering member;

an anti-misuse device;

co-operating inter-engagement means between said member and said device, whereby they may engage and dis-engage;

a first breakable link within said metering member, and adapted to be broken by disengagement of said member and said device; at least a second breakable link, breakable upon engagement of said member and said device;

a first indicator means operable upon breakage of said first link to indicate misuse of the apparatus;

and second indicator means operable upon breakage of said second link to indicate that said metering member has been brought into use.

* * * * *